United States Patent
Thompson et al.

(10) Patent No.: US 9,483,077 B2
(45) Date of Patent: Nov. 1, 2016

(54) CHARGE AND DATA TRANSFER SYSTEM, APPARATUS, AND METHOD

(71) Applicant: Leancode, LLC, Bellevue, WA (US)

(72) Inventors: Bernard Thompson, Bellevue, WA (US); Joshua Henry, Redmond, WA (US)

(73) Assignee: LEANCODE L.L.C., Bellevue, WA (US)

( * ) Notice: Subject to any disclaimer, the term of this patent is extended or adjusted under 35 U.S.C. 154(b) by 0 days.

(21) Appl. No.: 14/547,127

(22) Filed: Nov. 18, 2014

(65) Prior Publication Data

US 2015/0138704 A1 May 21, 2015

Related U.S. Application Data

(60) Provisional application No. 61/905,763, filed on Nov. 18, 2013.

(51) Int. Cl.
G06F 3/00 (2006.01)
G06F 1/16 (2006.01)
G06F 1/26 (2006.01)

(52) U.S. Cl.
CPC ............. *G06F 1/1632* (2013.01); *G06F 1/263* (2013.01)

(58) Field of Classification Search
None
See application file for complete search history.

(56) References Cited

U.S. PATENT DOCUMENTS

| | | | | |
|---|---|---|---|---|
| 6,483,698 B1* | 11/2002 | Loh | ........................ | G06F 1/1632 320/113 |
| 6,524,240 B1* | 2/2003 | Thede | ........................... | 600/300 |
| 6,614,206 B1* | 9/2003 | Wong | .................... | G06F 1/1632 320/135 |
| 7,059,769 B1* | 6/2006 | Potega | ........................... | 374/185 |
| 7,694,032 B2* | 4/2010 | Lim et al. | ...................... | 710/14 |
| 7,719,830 B2* | 5/2010 | Howarth | ............... | G06F 1/1632 312/223.2 |
| 8,237,414 B1* | 8/2012 | Li et al. | ........................ | 320/160 |
| 2012/0203949 A1* | 8/2012 | Benhard | ................ | G06F 13/14 710/303 |
| 2012/0279516 A1* | 11/2012 | Bouix et al. | .................. | 132/301 |
| 2013/0069583 A1* | 3/2013 | Lemelman et al. | .......... | 320/107 |
| 2013/0108064 A1* | 5/2013 | Kocalar et al. | ................. | 381/58 |
| 2013/0205060 A1* | 8/2013 | Benhard et al. | ............. | 710/303 |
| 2014/0199971 A1* | 7/2014 | Totzke | ................. | H04W 4/008 455/411 |

* cited by examiner

*Primary Examiner* — Michael Sun
(74) *Attorney, Agent, or Firm* — AEON Law; Adam L. K. Philipp

(57) ABSTRACT

Charge signal simulates a stock charger to connected portable device(s) to trigger a charging cycle. Monitoring charging port(s) for overcurrent and/or electrical short charging conditions allows charge current to be modified when necessary. While attached portable device(s) continue to charge, docking station automatically switches from charger mode to data transfer mode so that other attached devices can use and/or be used by portable device(s). Once data lines, except power line, are switched portable device(s) simultaneously charges and transfers data at same time. To identify proper charge signal, vendor identification (VID) or product identification (PID) may be read from attached portable device(s) and referenced against charging standards. Updatable firmware allows new device configurations and corresponding charge signals to be added.

13 Claims, 9 Drawing Sheets

CHARGE AND DATA TRANSFER SYSTEM, APPARATUS, AND METHOD

FIELD

The present disclosure relates to charge and data transfer for portable devices, such as tablets and/or smartphones. More particularly, to systems, apparatus, and methods for providing power and data transfer to a variety of different portable devices, where a mix of standardized and non-standardized methods of data transfer and charging are in use by the different portable devices.

BACKGROUND

As portable devices continue to get smaller, the pressure on device designers to reduce the number of external connectors increases. One popular method of reduction is to use a single connector on the portable device that can perform different operations previously provided by several different traditional connectors, such as power and data transfer on the portable device. Unfortunately, a standard multipurpose connector is often not as fast at a particular operation as a dedicated connector for that same operation.

Additionally, due to increased power/charging demands by consumer devices, the portable device industry has been racing ahead of existing power/charging standards with proprietary non-standard charging methodologies in an attempt to support charging on their devices at higher rates. Thus, while the USB (Universal Serial Bus) standard does allow for power delivery across its connection, the standard current levels provided under the standard are rarely comparable to those of a dedicated charger. For example, a standard USB downstream port (SDP) only supplies a maximum of 500 mA at 5V, which means that charge times using the USB On-The-Go (OTG) standard are substantially longer. As a result device manufacturers continue to proliferate non-standardized and incompatible charging methods, which may result in damage to both the portable device and connected chargers whenever incompatibly matched.

Moreover an OTG compatible portable device may only be able to perform one operation at a time. For example, on certain portable devices, a data transfer operation may preclude a charging operation. More particularly, in some configurations, the standard multipurpose connectors cannot provide simultaneous data transfer and charging of the portable device. This is particularly true when the different operations require the portable device to be configured as two completely different devices. For example, during a data transfer a portable device may be connect to a powered USB Hub, which has no means by the baseline USB standard to charge the attached portable device. More specifically, the USB standard requires that the lone 5V power line of the USB Hub may not allow back-voltage across the connection to the attached portable device. To obtain compliance with the standard, this 5V power line of the USB Hub is typically blocked with a one-way circuit element, such as a diode, which directly interferes with any ability to charge using that 5V power line. Thus, according to the requirements of the USB standard, the portable device cannot be simultaneously connected to both a USB charger and a USB Hub. Moreover, even though the USB charging ports use the same standard Type-A USB connector, dedicated charging ports (DCP) are used strictly for power and require no host connection but offer no data transfer capabilities as a result. Unfortunately, even charging downstream ports (CDP), which support data transfers and can provide up to 1.5 A to connected USB peripheral devices (three times the power available on a standard USB port), do not provide enough current to quickly charge modern high-current and battery-powered portable devices.

Accordingly, because of the previously mentioned limitations of existing USB chargers, each portable device often employs special signaling mechanisms to identify when a connected charger may provide a customized, and often accelerated, charge to the portable device. Unfortunately, these signaling mechanisms are typically non-standardized signals sent using the USB data lines and thus directly interfere with simultaneous data transfer.

BRIEF DESCRIPTION OF THE DRAWINGS

The aspects of the present disclosure are best understood from the detailed description when read in relation to the accompanying drawings. The drawings illustrate a variety of different aspects, features, and embodiments of the disclosure, as such it is understood that the illustrated embodiments are merely representative and not exhaustive in scope. The disclosure will now be described with reference to the accompanying drawings, wherein like numbers refer to like elements.

DETAILED DESCRIPTION

Figure 1:
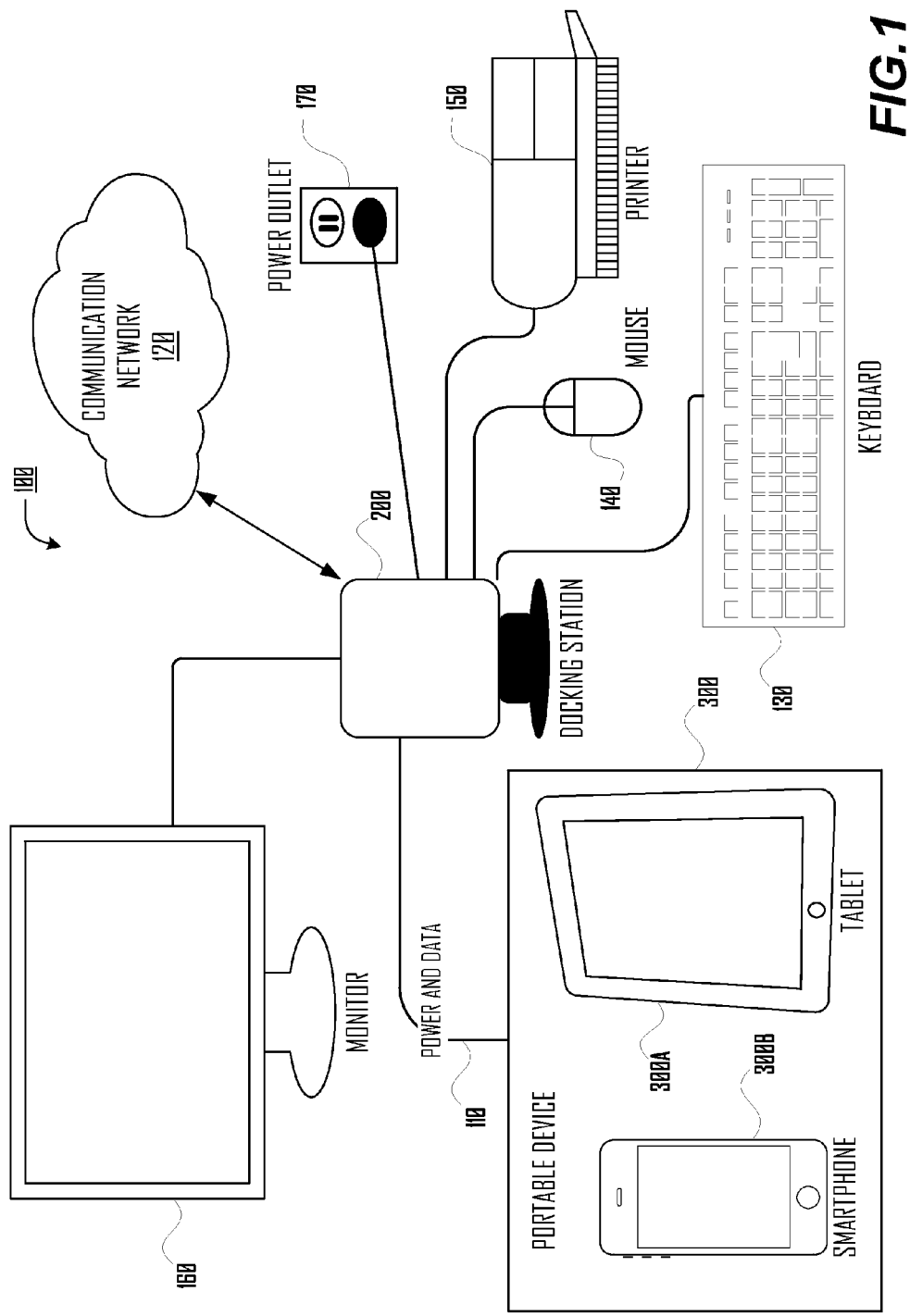
FIG. 1 illustrates a suitable charge and data transfer environment wherein a docking station provides power and data to a connected portable device in accordance with at least one embodiment.

In accordance with various embodiments of the invention, charge and data systems, apparatus, and methods are described that overcome the hereinafore-mentioned disadvantages of the heretofore-known charging and data transfer methods, apparatus and systems of this general type and that simulate a charge signal of a stock charger to connected portable device(s) to trigger a charging cycle in the portable device(s) and while attached portable device(s) continue to charge, automatically switch from a charger simulation mode to a data transfer mode so that other attached devices can use and/or be used by portable device(s). Additionally, the described embodiments provide charging mechanisms, once data lines except power line are switched, to simultaneously charge and transfer data at same time. In at least one embodiment, the charging port(s) are monitored for overcurrent and/or electrical short charging conditions to allow charge current to be modified when necessary. In one embodiment, vendor identification (VID) or product identification (PID) may be read from attached portable device(s) and referenced against charging specifications to identify proper charge signals.

In the following detailed description, reference is made to the accompanying drawings which form a part hereof wherein like numerals designate like parts throughout, and in which are shown, by way of illustration, specific embodiments in which the disclosure may be practiced. Various aspects of the illustrative embodiments will be described using terms commonly employed by those skilled in the art to convey the substance of their work to others skilled in the art. However, the embodiments described herein may be practiced with only some of the described aspects. For purposes of explanation, specific numbers, materials, and configurations may be set forth to provide a thorough understanding of the illustrative embodiments. However, the embodiments described herein may be practiced without the specific details. In other instances, well-known features are omitted or simplified in order not to obscure the illustrative embodiments. Further, various operations and/or communications may be described as multiple discrete operations and/or communications, in turn, in a manner that may be helpful in understanding the embodiments described herein; however, the order of description should not be construed as to imply that these operations and/or communications are necessarily order dependent. In particular, these operations and/or communications need not be performed in the order of presentation.

The detailed description that follows is represented largely in terms of processes and symbolic representations of operations by conventional computing components, including a processor unit, memory storage devices for the processor, connected display devices and input devices. It is to be understood that other embodiments may be utilized and structural or logical changes may be made without departing from the scope of the present disclosure. Therefore, the following detailed description is not to be taken in a limiting sense, and the scope of a portion of the present disclosure is defined by the claims and appended drawings and their equivalents.

Throughout the specification and drawings, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure, but are not necessarily included on all embodiments of the disclosure. The meaning of "in" may include "in" and "on." The phrases "in one embodiment" or "in an embodiment" or "in various embodiments" or "in some embodiments" and the like are used repeatedly. Such phrases in various places in the specification do not necessarily all refer to the same embodiment, but it may unless the context dictates otherwise. For the purposes of this disclosure and the claims that follow, the terms "coupled" and "connected" have been used to describe how various elements interface. The terms "connected" or "coupled" can mean a direct connection between items, an indirect connection through one or more intermediaries, or communication between items in a manner that may not constitute a direct mechanical, systematic, physical, or other connection between the items connected. For example, in various embodiments component devices may be connected via a wireless connection that may allow for the exchange of data and/or information between the participating devices. The terms "connector", "plug", and "receptacle" may or may not be used interchangeably depending on context and typically refer to a physical mechanism used to create a physical, an electrical, and a logical connection between different devices. In addition, the words "standard" and "non-standard" as referenced in various places in the disclosure, typically refer to a set of design specifications that control charge and data transfer interaction between devices. As used herein a "standard" refers to a published and/or documented design specification from a recognized standard body, such as USB Implementers Forum, Inc. (USB-IF) or Institute of Electrical and Electronics Engineers (IEEE). In contrast, the term "non-standard" refers to unpublished or undocumented design specifications, such as a proprietary charging standard developed by a specific manufacturer. Moreover, a "non-standard" design specification should vary from the "standard" design specification in a manner that may or may not make the two incompatible with each other, but at the very least makes them different.

Reference is now made in detail to the description of the embodiments as illustrated in the drawings. Particular embodiments described in this application provide specific case implementations of charge and data transfer systems, apparatus and methods. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Referring to FIG. 1, a suitable charge and data transfer environment 100 is shown wherein a docking station 200 provides power and data to connected portable device(s) 300 in accordance with at least one embodiment. The docking station 200 is also coupled to communication network 120, various Human Interface Devices (HID) (e.g., keyboard 130, mouse 140, printer 150), monitor 160, and a power source 170. In various embodiments, communication network 120 may include the Internet, a local area network ("LAN"), a wide area network ("WAN"), a wireless data network, a cellular data network, and/or other data network. More specifically, the cellular data network can relate to 3GPP/3GPP2 Radio Technologies like 2G (GSM/GPRS); 3G (UMTS/HSPA/CDMA); and 4G (LTE/HSPA+). Similarly, the wireless data network may include microwave data networks and/or other wireless technologies including WiFi (IEEE 802.11x), NFC, location and Bluetooth. Moreover, it is understood by those of skill in the art that the communication network 120 includes any combination of the above. In one embodiment, docking station 200 may access communication network 120 to obtain new device information when a connected portable device 300 is not recognized. Alternatively, the portable device 300 may provide information to allow the docking station 200 to recognize a previously unknown device. In other embodiment, multiple additional portable client devices and/or non-client devices may be present.

Figure 2:
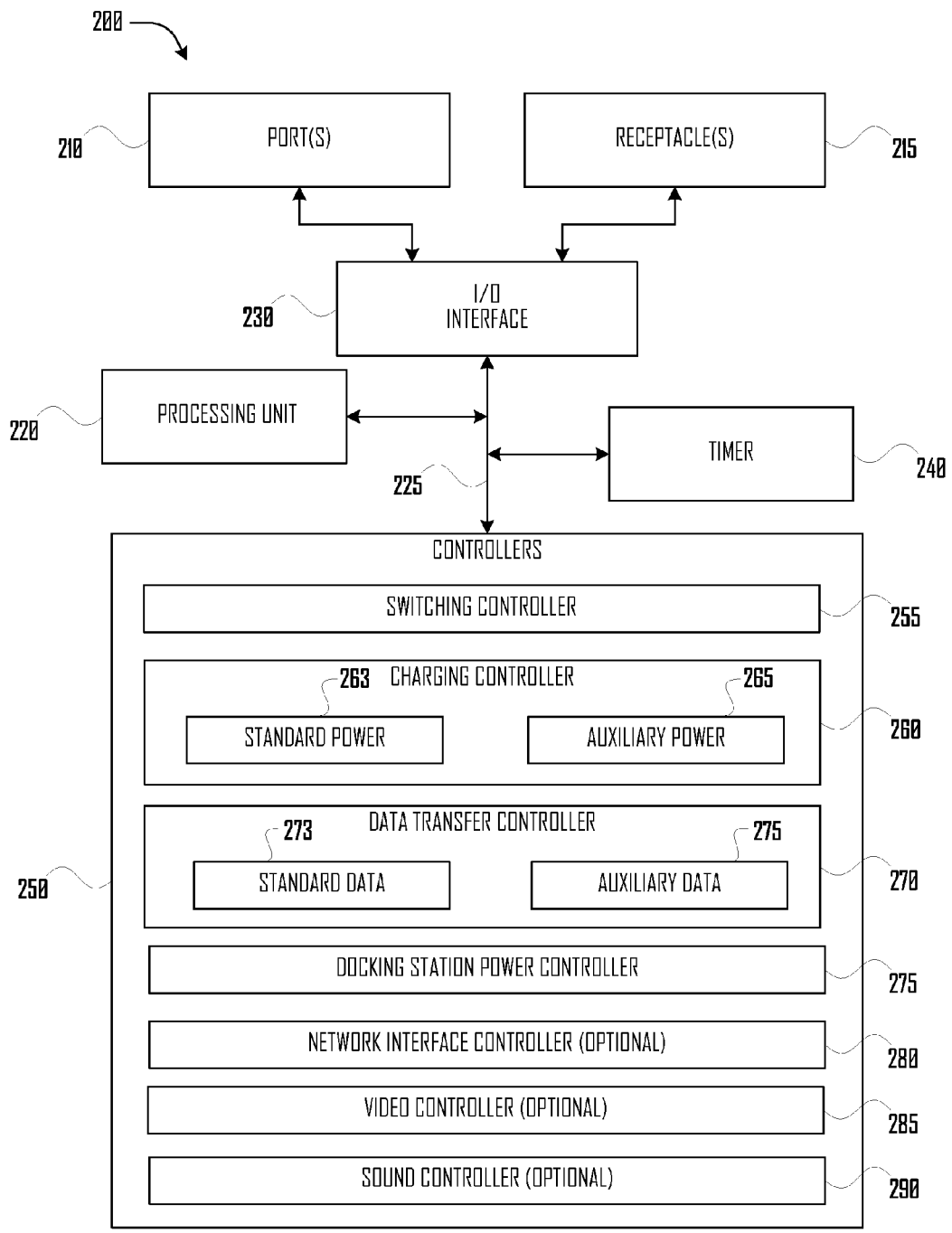
FIG. 2 illustrates several components of the docking station shown in FIG. 1 in accordance with one embodiment.

Referring to FIG. 2, several components of the docking station 200 are shown in accordance with one embodiment. The docking station 200 includes control logic, which may or may not include one or more processors, collectively represented as a processing unit 220, a timer 240, and controllers 250. In one embodiment these components are all interconnected along with the I/O interface 230 via a communication bus or circuitry 225. As shown in FIG. 2, the I/O communication interface 230 includes port(s) 210 and receptacle(s) 215 for connecting to the portable device 300, a power source 170, monitor 160, various Human Interface Devices (HID) (e.g., keyboard 130, mouse 140, printer 150), and the communication network 120. Depending on the specific device these connections are logical, electrical, and/or physical. However, in at least one embodiment, the docking station 200 also includes wireless connections with the communication network 120 and/or available HID and other local resources (including, for example, a television/monitor). In one embodiment, the port(s) 210 and receptacle(s) 215 are multipurpose connectors that support both charge and data transfer. In one embodiment, the multipurpose connector is a USB plug and/or receptacle.

The controllers 250 include switching controller 255, charging controller 260, data transfer controller 270, and docking station power controller 275. The controllers 250 may optionally also include network interface controller 280, video controller 285, and sound controller 290. Charging controller 260 includes a standard power controller 263 and an auxiliary power controller 265. Data transfer controller 270 includes a standard data controller 273 and an auxiliary data controller 275. The auxiliary power controller 265 provides an alternative power source to the standard power controller which may have been blocked with a diode or other mechanism. The auxiliary data controller 275 enables the docking station 200 to provide non-standard charging signals on the standard data transfer lines. While this auxiliary data circuit is active, devices may recognize the signal to start charging, but data transfer will not be possible. In one embodiment, controllers 250 may include updatable firmware, to add supports for new charging mechanisms.

Figure 3:
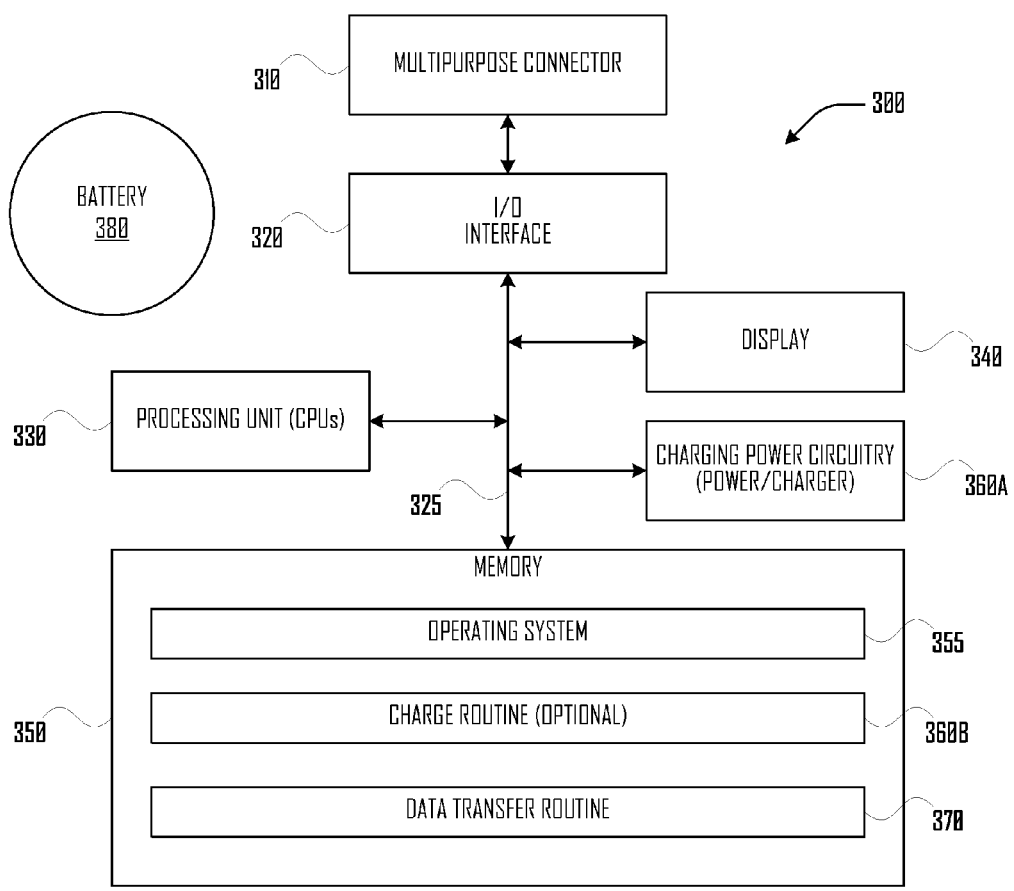
FIG. 3 illustrates several components of the portable device shown in FIG. 1 in accordance with one embodiment.

Referring to FIG. 3, several components of the portable device 300 are shown in accordance with one embodiment. The portable device 300, such as a tablet and/or smartphone, includes at least one multipurpose connector 310, an I/O interface 320, one or more processors, collectively represented as processing unit 330, and display 340 all interconnected via a communication bus 325. In one embodiment, the portable device 300 includes at least one battery 380 that may be charged by charging power circuitry 360A and/or charge routine 360B. The memory 350 generally comprises a random access memory ("RAM"), a read only memory ("ROM"), and a permanent mass storage device, such as a disk drive, flash device, or the like. The memory 350 stores program code for a number of applications, which includes executable instructions for data transfer routine 370 and optional charge routine 360B. In addition, the memory 350 also stores an operating system 355. In some embodiments, software components may also be loaded via the I/O communication interface 320. In some embodiments, the portable device 300 may include many more components than those shown in FIG. 3. However, it is not necessary that all of these generally conventional components be shown in order to disclose an illustrative embodiment.

Figure 4:
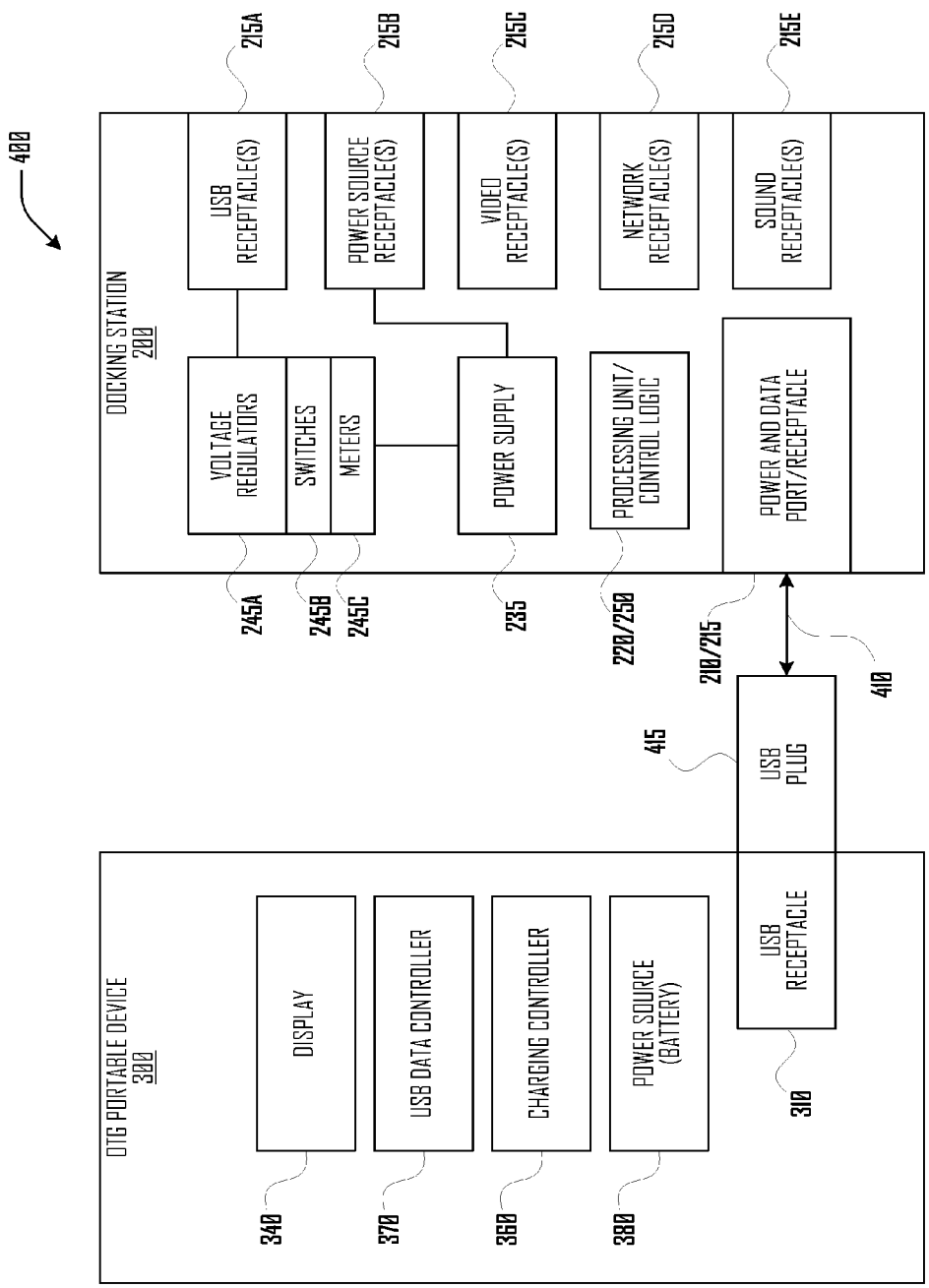
FIG. 4 illustrates several components of the docking station shown in FIG. 2 physically, electrically, and logically connected to the portable device shown in FIG. 3 in accordance with one embodiment.

Referring to FIG. 4, a wired OTG USB charge and data transfer environment 400 is shown with the docking station 200 physically, electrically, and logically connected via a USB cable 410 with a USB plug 415 to the portable device 300 in accordance with at least one embodiment. Although most embodiments use a wired connection between the docking station 200 and the portable device 300, in at least one configuration, docking station 200 may allow for wireless connections with the portable device in addition to the wired connection. The docking station 200 includes processing unit/control logic 220/250, power supply 235, voltage regulators 245A, switches 245B, meter 245C, power and data port/receptacle(s) 210/215, optional USB receptacle(s) 215A, power receptacle(s) 215B, optional video receptacle(s) 215C, optional network receptacle(s) 215D, and optional sound receptacle(s) 215E. The portable device 300 includes USB receptacle(s) 310, display 340, USB data controller 370, charging controller 360, and power source (battery) 380. In one embodiment, the portable device 300 is an OTG USB device and generates a sense signal upon detection of a connection to the USB receptacle 310.

Figure 5:
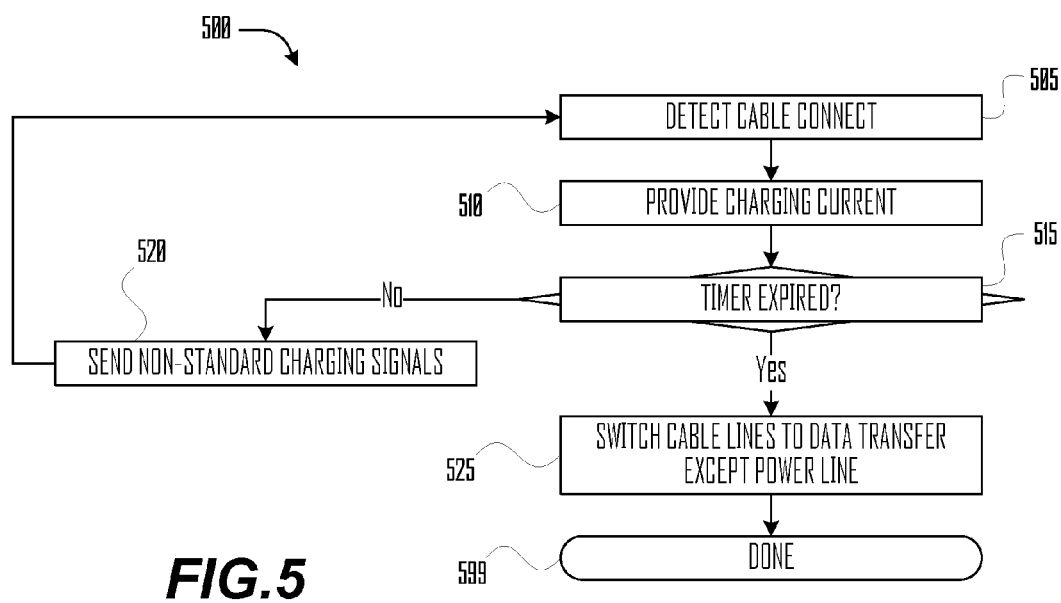
FIG. 5 illustrates a flow diagram of a charge and data transfer routine for the docking station shown in FIG. 1 in accordance with one embodiment.

Referring to FIG. 5, a flow diagram of a charge and data transfer routine 500 for the docking station is shown in accordance with at least one embodiment. Routine 500 detects a cable connection in block 505 and subsequently provides a charging current in block 510. In query block 515 routine 500 determines whether a timer has expired. If the timer has not yet expired, the routine 500 continues to send at least one non-standard charging signal in block 520 and returns to block 505 to determine if cable is still connected. Once query block 515 determines that the timer has expired, routine 500 switches cable lines, except the power line, from charging signals to data transfer. In many cases, routine 500 will allow a connected portable device to continue charging even while simultaneously transferring data. A combination that is often expressly precluded on the connected portable device without routine 500.

Figure 6:
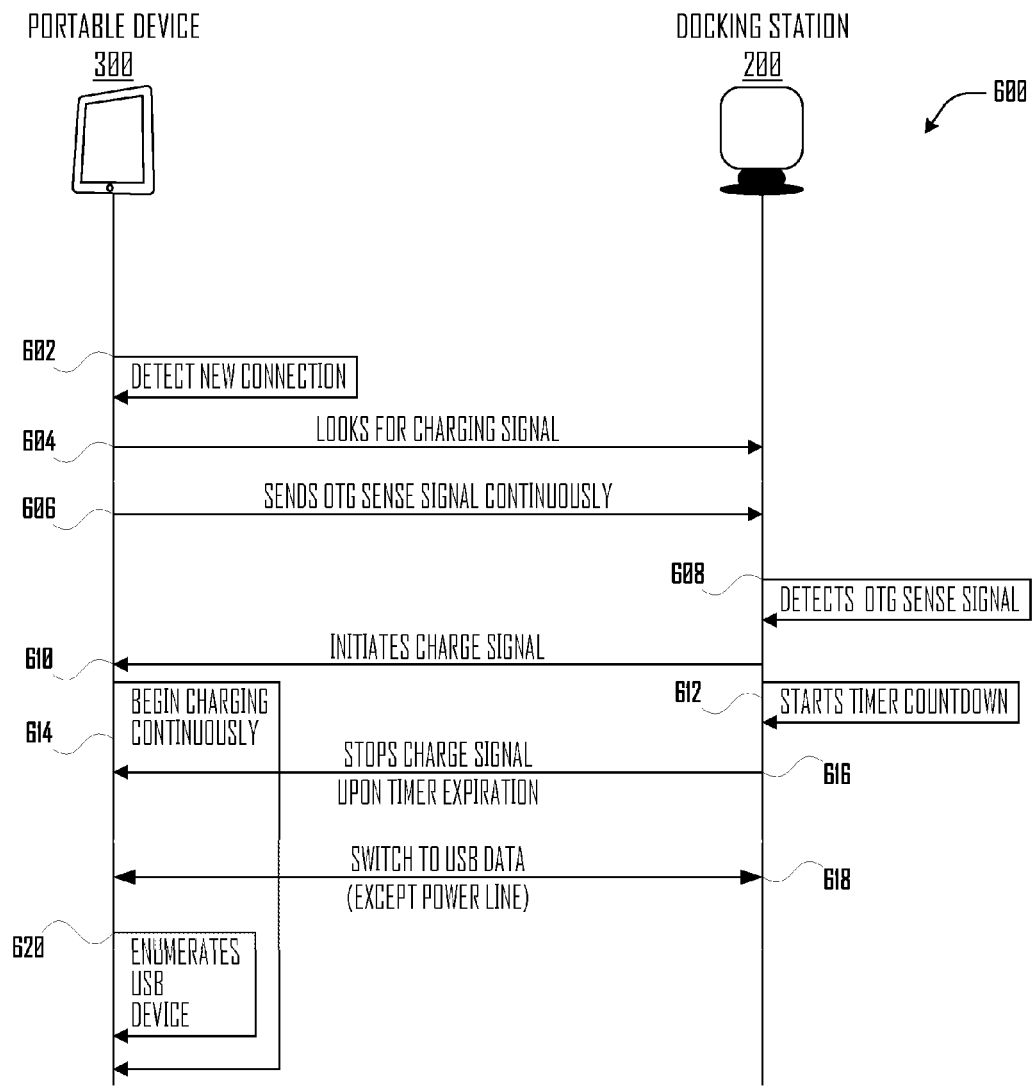
FIG. 6 illustrates a series of communications between the portable device shown in FIG. 3 and the docking station shown in FIG. 2 to initiate charging of the portable device in accordance with one embodiment.

Referring to FIG. 6, a sequence of communications 600 between the portable device 300 and the docking station 200 are shown to simulate a charge signal of a stock charger to initiate charging of the portable device 300 in accordance with at least one embodiment. The illustrated sequence of communications 600 show one scenario in which the portable device 300 detects 602 a new connection and looks 604 for a charging signal. In the illustrated embodiment, the portable device 300 is a USB OTG compatible device and sends 606 an OTG sense signal continuously to the docking station 200. In response, the docking station 200, after detecting 608 the OTG sense signal, simulates a charge signal of a stock charger that may be associated with the connected portable device. The docking station 200 initiates 610 the charge signal with connected portable device 300 to trigger a charging cycle in the portable device 300. After starting 610 the charge signal, the docking station 200 also starts 612 a timer countdown that indicates when the docking station 200 stops 616 the charge signal. The portable device 300 begins charging continuously 614 after receiving the charge signal. Upon timer expiration, the docking station 200 stops 616 the charge signal. In one embodiment, the portable device 300 continues charging even after the charge signal stops 616. After timer expiration, the docking station 200 switches 618 the data lines, except the power line, to USB data and begins data exchange with the portable device 300. After the switch, the portable device 300 can begin to enumerate 620 and use the attached USB device(s). In one embodiment, whenever the OTG sense signal is lost by the docking station 200, the sequence of communications 600 returns to detecting 608 the OTG sense signal and resends the charge signal.

Figure 7:
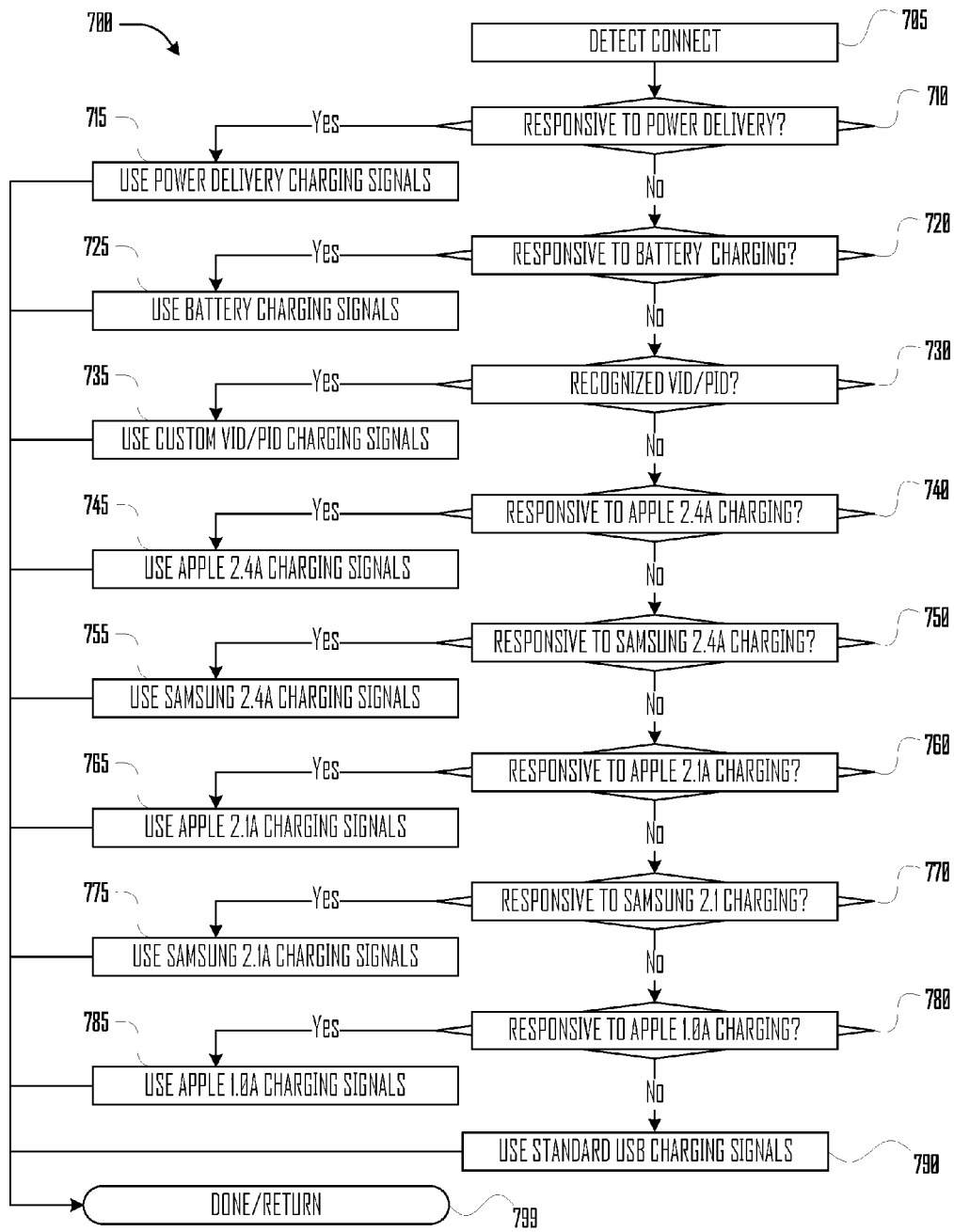
FIG. 7 illustrates a flow diagram of a charge signaling routine for the docking station shown in FIG. 1 in accordance with one embodiment.

Referring to FIG. 7, a flow diagram of a charge signaling routine 700 for the docking station is shown in accordance with one embodiment. In block 705, routine 700 detects a connection. Query block 710 determines whether the connected device is responsive to USB Power Delivery Specification charging signals. If the connected device responds, routine 700 uses the USB Power Delivery Specification charging signals in block 715 to charge the device. Otherwise routine 700, in query block 720, determines whether the connected device is responsive to USB Battery Charging Specification charging signals. If the connected device responds, routine 700 uses the USB Battery Charging Specification charging signals in block 725 to charge the device. Otherwise routine 700, in query block 730, determines whether the connected device is responsive to VID/PID specific charging signals. If the connected device responds, routine 700 uses the VID/PID specific charging signals in block 735 to charge the device. Otherwise routine 700, in query block 740, determines whether the connected device is responsive to non-standard Apple 2.4 Amp charging signals. If the connected device responds, routine 700 uses the non-standard Apple 2.4 Amp charging signals in block 745 to charge the device. Otherwise routine 700, in query block 750, determines whether the connected device is responsive to non-standard Samsung 2.4 Amp charging signals. If the connected device responds, routine 700 uses the non-standard Samsung 2.4 Amp charging signals in block 755 to charge the device. Otherwise routine 700, in query block 760, determines whether the connected device is responsive to non-standard Apple 2.1 Amp charging signals. If the connected device responds, routine 700 uses the non-standard Apple 2.1 Amp charging signals in block 765 to charge the device. Otherwise routine 700, in query block 770, determines whether the connected device is responsive to non-standard Samsung 2.1 Amp charging signals. If the connected device responds, routine 700 uses the non-standard Samsung 2.1 Amp charging signals in block 775 to charge the device. Otherwise routine 700, in query block 780, determines whether the connected device is responsive to non-standard Apple 1.0 Amp charging signals. If the connected device responds, routine 700 uses the non-standard Apple 1.0 Amp charging signals in block 785 to charge the device. Otherwise routine 700 uses the standard USB charging signals in block 790 to charge the device. In other embodiments, new charging specifications may be added to routine 700 in order of descending current to optimize charging for backward compatible devices.

Figure 8:
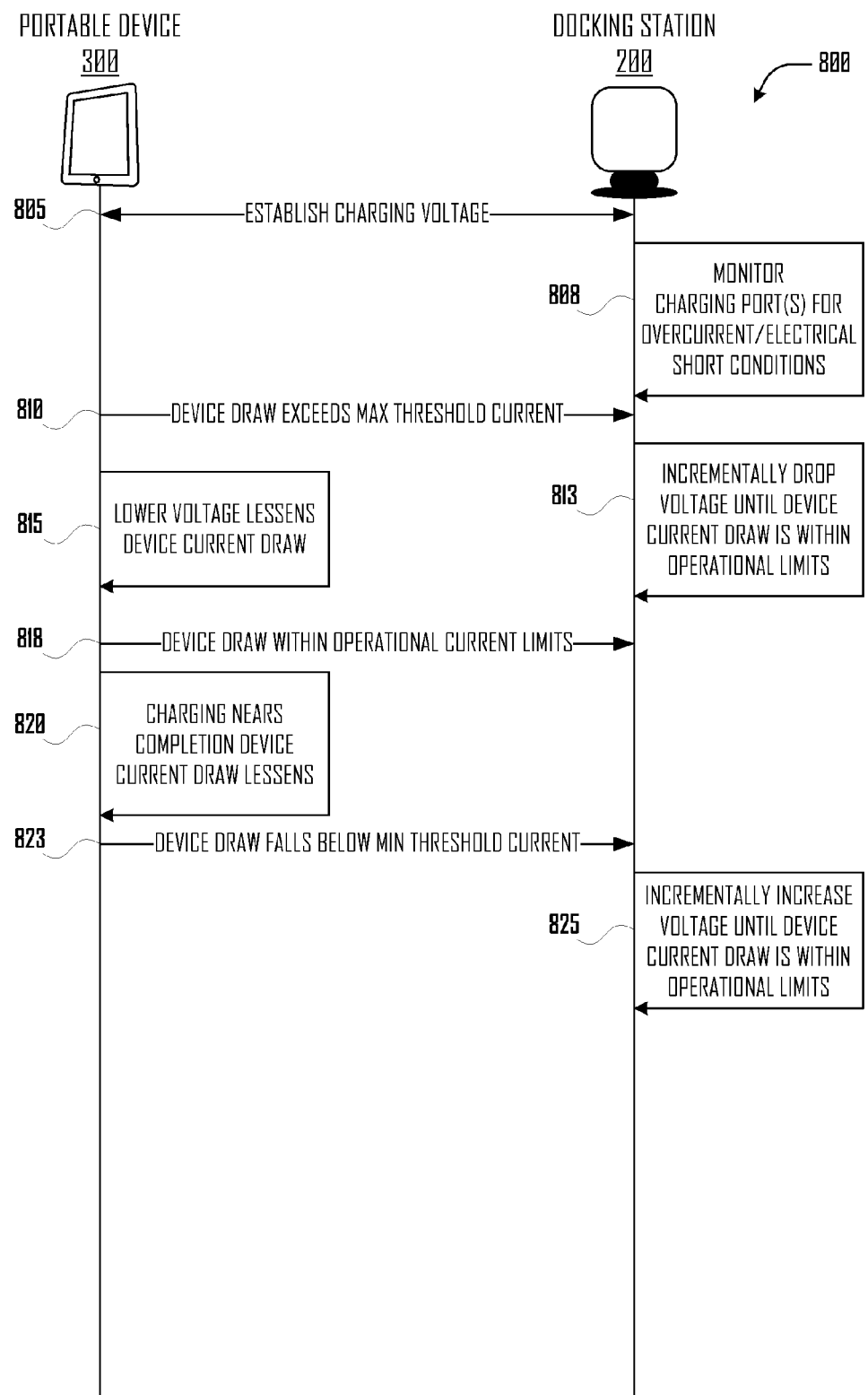
FIG. 8 illustrates a series of communications between the portable device shown in FIG. 3 and the docking station shown in FIG. 1 to incrementally increase/decrease voltage to maintain optimal current draw of the portable device in accordance with one embodiment.

Referring to FIG. 8, a series of communications 800 between the portable device 300 and the docking station 200 are shown to incrementally increase/decrease voltage to maintain optimal current draw of the portable device 300 in accordance with at least one embodiment. The illustrated sequence of communications 800 shows one scenario in which the docking station 200 establishes a charging voltage 805 with the portable device 300. The docking station 200 monitors 808 charging port(s) for overcurrent and/or electrical short conditions. When portable device 300 exceeds 810 a designated maximum threshold current the docking station incrementally drops 813 voltage until the portable device is within operational limits. For example, in one embodiment, the docking station may drop the voltage in 5% increments until the current draw is acceptable. The lower voltage lessens 815 the portable device 300 current draw until the portable device 300 current draw is within operational current limits 818. As charging of the portable device nears completion, the current draw also lessens 820. Once the portable device current draw falls below 823 the minimum threshold current, the docking station 200 may incrementally increase voltage 825 until the portable device current draw is back within operational limits.

Figure 9:
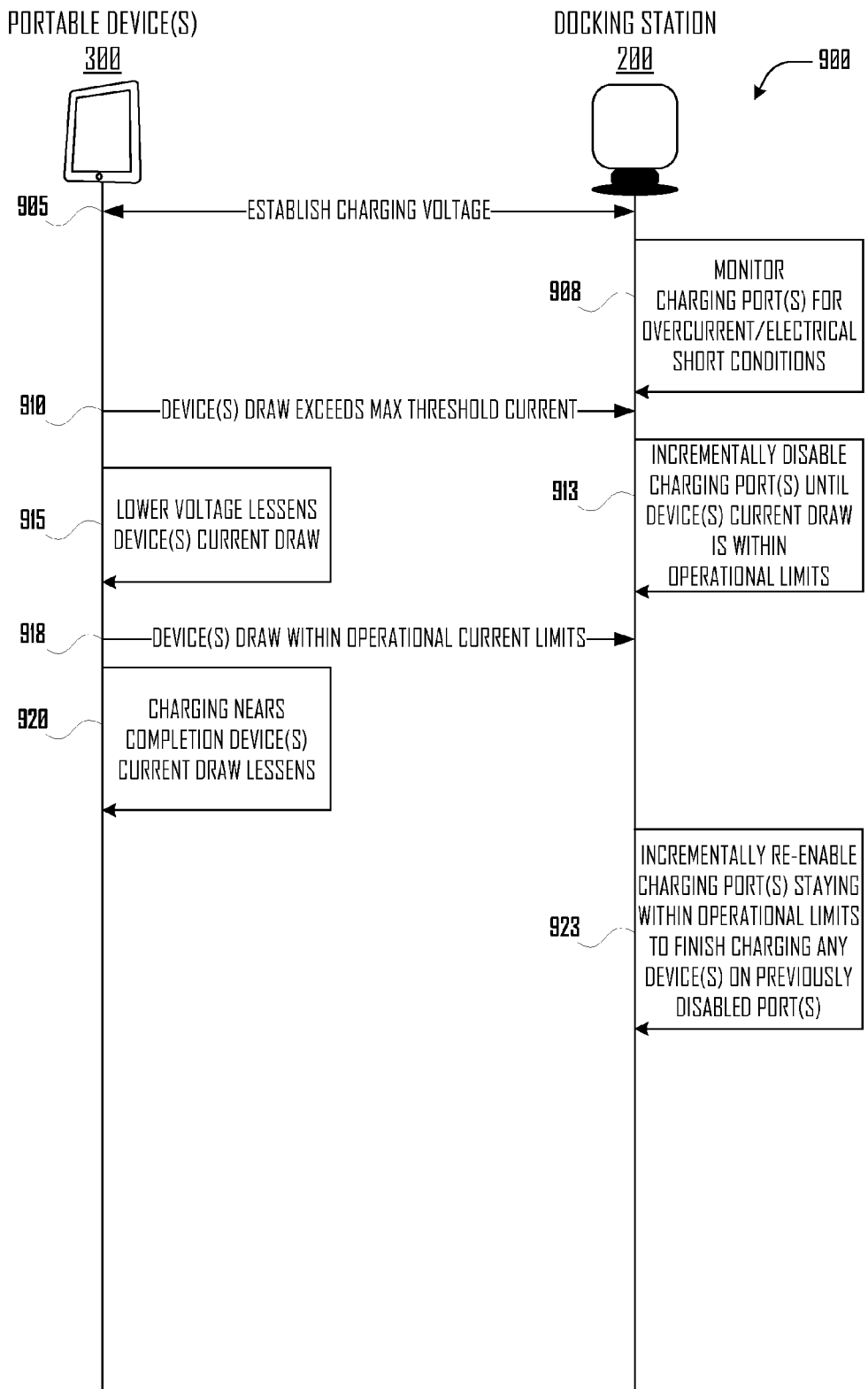
FIG. 9 illustrates a series of communications between the portable device(s) and the docking station shown in FIG. 1 to incrementally disable/re-enable charging port(s) to maintain optimal current draw of the portable device(s) in accordance with one embodiment.

Referring to FIG. 9, a series of communications 900 between the portable device(s) 300 and the docking station 200 are shown to incrementally disable/re-enable charging port(s) to maintain optimal current draw of the portable device(s) in accordance with at least one embodiment. The illustrated sequence of communications 900 shows one scenario in which the docking station 200 establishes a charging voltage 905 with at least one portable device 300. The docking station 200 monitors 908 charging port(s) for overcurrent and/or electrical short conditions. When portable device(s) 300 exceed 910 a designated maximum threshold current the docking station incrementally disables 913 charging port(s) until the current draw for the remaining portable device(s) is within operational limits. The fewer ports may lower voltage and lessens 915 the portable device(s) current draw until the portable device(s) current draw is within operational current limits 918. As charging of the portable device(s) nears completion, the current draw also lessens 920. The docking station 200 may incrementally re-enable charging port(s) 923 staying within operational limits to finish charging any device(s) on previously disabled port(s).

Although specific embodiments have been illustrated and described herein, a whole variety of alternate and/or equivalent implementations may be substituted for the specific embodiments shown and described without departing from the scope of the present disclosure. Thus, although the subject matter has been described in language specific to structural features and/or methodological acts, it is also to be understood that the subject matter defined in the appended claims is not necessarily limited to the specific features or acts described. Rather, the specific features and acts are disclosed as example forms of implementing the claims. This application is intended to cover any adaptations or variations of the embodiments discussed herein.

The invention claimed is:

1. A data transfer and charging system comprising:
 a portable device with at least one multipurpose connector, the portable device recognizing at least one non-standard charge signaling option to initiate charging, signals of the at least one non-standard charge signaling option preclude simultaneous data transfer;
 a docking station to charge and transfer data to the portable device, the docking station selectively coupled using data transfer lines to the portable device via the at least one multipurpose connector, the docking station further comprising:
  at least one data transfer source selectively accessible to the portable device across the data transfer lines;
  at least one auxiliary charger having a signal generator and a current source, the signal generator configured to send non-standard charging signals to the portable device via the data transfer lines and the current source providing an alternative charging option to a power line;
  at least one timer coupled to the at least one auxiliary charger to enable charging until expiration of timer; and
  a multi-way switch to change the data transfer lines from the at least one auxiliary charger to the data transfer source upon expiration of the timer while leaving the current source charging.

2. The system as recited in claim 1, wherein the at least one multipurpose connector of the portable device is a USB receptacle and is directly connected to the docking station via a USB cable.

3. The system as recited in claim 2, wherein the non-standard charge signaling options include Apple-compatible 2.4 Amp charging signals, Samsung-compatible 2.4 Amp charging signals, Apple-compatible 2.1 Amp charging signals, Samsung-compatible 2.1 Amp charging signals, and Apple-compatible 1.0 Amp charging signals.

4. The system as recited in claim 1, wherein the portable device is battery-operated.

5. The system as recited in claim 1, wherein the generated non-standard charging signals include customized charging signals generated based on a detected Vendor Identification (VID) and/or product identification (PID) of the portable device.

6. The system as recited in claim 1, wherein the standard power line connected to the portable device is blocked to prevent back-voltage during data transfers but is connected to the auxiliary charger current source once charging is initiated on the portable device using non-standard charging signals.

7. A data transfer and charging apparatus, comprising:
at least one power and data transfer interface, coupled to a signal source, to selectively connect to a portable device and to detect when the portable device is connected and/or charging;
at least one auxiliary charge controller, coupled to the interface, to generate non-standard charging signals upon detection of a connection to the portable device;
at least one auxiliary current source, coupled to the interface, to charge the portable device upon detection of a connection to the portable device;
at least one timer, coupled to the auxiliary charge controller, enabling the at least one auxiliary charge controller, upon detection of a connection to the portable device, to continuously generate the non-standard charging signals until expiration of the timer; and
a multi-way switch, coupled to the timer, to change the signal source of the interface from the signals generated by the auxiliary charge controller to data transfer signals upon expiration of the timer.

8. The apparatus as recited in claim 7, further comprising a charging controller including a standard power controller to generate standard charging signals and the at least one auxiliary charge controller to generate the non-standard charging signals, the charging controller monitoring charging ports for overcurrent and/or electrical short charging conditions.

9. The apparatus as recited in claim 8, wherein the charging controller, upon detection of overcurrent and/or electrical short charging conditions incrementally drops voltage until current draw is reduced to operational levels for the connected portable device.

10. The apparatus as recited in claim 8, wherein the charging controller, upon detection of overcurrent and/or electrical short charging conditions incrementally disables charging ports until current draw is reduced to operational levels for the connected portable device.

11. The apparatus as recited in claim 7, further comprising a data transfer controller which includes a standard data controller to control normal data transfer and an auxiliary data controller to control data transfer during non-standard charging.

12. The apparatus as recited in claim 7, wherein the generated non-standard charging signals include customized charging signals generated based on a detected Vendor Identification (VID) and/or product identification (PID) of the portable device.

13. The apparatus as recited in claim 7, wherein the generated non-standard charging signals automatically switch between a plurality of different charging signals after the portable device is connected until proper charging response is detected, the different charging signals including standard USB Power Delivery Specification charging signals, standard USB Battery Charging Specification signals, and non-standard Apple-compatible 2.4 Amp charging signals, non-standard Samsung-compatible 2.4 Amp charging signals, non-standard Apple-compatible 2.1 Amp charging signals, non-standard Samsung-compatible 2.1 Amp charging signals, and non-standard Apple-compatible 1.0 Amp charging signals.

* * * * *